United States Patent
Chang et al.

(10) Patent No.: US 8,252,429 B2
(45) Date of Patent: Aug. 28, 2012

(54) COMPOSITE ARTICLES MADE BY PROCESS FOR JOINING STAINLESS STEEL PART AND ZIRCONIA CERAMIC PART

(75) Inventors: Hsin-Pei Chang, New Taipei (TW);
Wen-Rong Chen, New Taipei (TW);
Huann-Wu Chiang, New Taipei (TW);
Cheng-Shi Chen, New Taipei (TW);
Wen-Feng Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/172,264

(22) Filed: Jun. 29, 2011

(65) Prior Publication Data
US 2012/0156518 A1    Jun. 21, 2012

(30) Foreign Application Priority Data
Dec. 20, 2010    (CN) .......................... 2010 1 0596263

(51) Int. Cl.
*B32B 15/04*    (2006.01)
*B32B 15/18*    (2006.01)
*B32B 18/00*    (2006.01)

(52) U.S. Cl. ........ 428/632; 428/663; 428/680; 428/682; 428/685

(58) Field of Classification Search .................. 428/610, 428/632, 633, 660, 663, 680, 681, 682, 683, 428/684, 685
See application file for complete search history.

(56) References Cited

U.S. PATENT DOCUMENTS
5,161,908 A * 11/1992 Yoshida et al. ................ 403/29

FOREIGN PATENT DOCUMENTS
JP    3005637 B2 *    1/2000

OTHER PUBLICATIONS
Machine Translation, Yamakawa et al., JP 30005637 B2, Jan. 2000.*

* cited by examiner

Primary Examiner — Michael La Villa
(74) Attorney, Agent, or Firm — Altis Law Group, Inc.

(57) ABSTRACT

A process for joining a stainless steel part and a zirconia ceramic part comprising: providing a SUS part, a ZrO ceramic part, a Mo foil and a Ni foil; placing the ZrO ceramic part, the Mo foil, the Ni foil, and the SUS part into a mold, the Mo foil and the Ni foil located between the ZrO ceramic part and the SUS part, the Mo foil abutting against the ZrO ceramic part, the Ni foil abutting against the SUS part and the Mo foil; placing the mold into a chamber of an hot press sintering device, heating the chamber and pressing the SUS part, the ZrO ceramic part, the Mo foil, and the Ni foil at least until the SUS part, the ZrO ceramic part, the Mo foil and the Ni foil form a integral composite article.

4 Claims, 2 Drawing Sheets

COMPOSITE ARTICLES MADE BY PROCESS FOR JOINING STAINLESS STEEL PART AND ZIRCONIA CERAMIC PART

CROSS-REFERENCE TO RELATED APPLICATIONS

The disclosures of the three listed applications are incorporated by reference in this instant application. All listed applications have the same assignee.

| Ser. No. | Title | Inventors | Current Status |
|---|---|---|---|
| 13/172,271 | PROCESS FOR JOINING BRASS PART AND SILICON CARBIDE CERAMIC PART AND COMPOSITE ARTICLES MADE BY SAME | HSIN-PEI CHANG et al. | Pending |
| 13/172,274 | PROCESS FOR JOINING BRONZE PART AND SILICON CARBIDE CERAMIC PART AND COMPOSITE ARTICLES MADE BY SAME | HSIN-PEI CHANG et al. | Pending |
| 13/172,280 | PROCESS FOR JOINING BRASS PART AND SILICON CARBIDE CERAMIC PART AND COMPOSITE ARTICLES MADE BY SAME | HSIN-PEI CHANG et al. | Allowed |

BACKGROUND

1. Technical Field

The present disclosure relates to a process for joining a metal part and a ceramic part, especially to a process for joining a stainless steel part and a zirconia ceramic part, and a composite article made by the process.

2. Description of the Related Art

It is desirable to join stainless steel parts and zirconia ceramic parts. A typical process for joining stainless steel and zirconia ceramic is by positioning physically separate copper foil or molybdenum foil as intermediate layer between stainless steel and zirconia ceramic. However, the foil retains its separate nature through manufacturing and in the final product and does not chemically interact with the stainless steel or zirconia ceramic. Furthermore, in case of using physically separate copper foil, due to great difference between the coefficients of heat expansion of the zirconia ceramic and the copper foil, the ceramic/copper interface has large thermal stress, thus, the bond between the stainless steel and the zirconia ceramic via copper foil is not as stable as desired. In case of using physically separate molybdenum foil, due to having a relatively low reaction activity, it is difficult for zirconia ceramic and molybdenum foil to inter-diffuse into each other, enhancing the difficulty of bonding the various separate intermediate layers.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining stainless steel part and zirconia ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
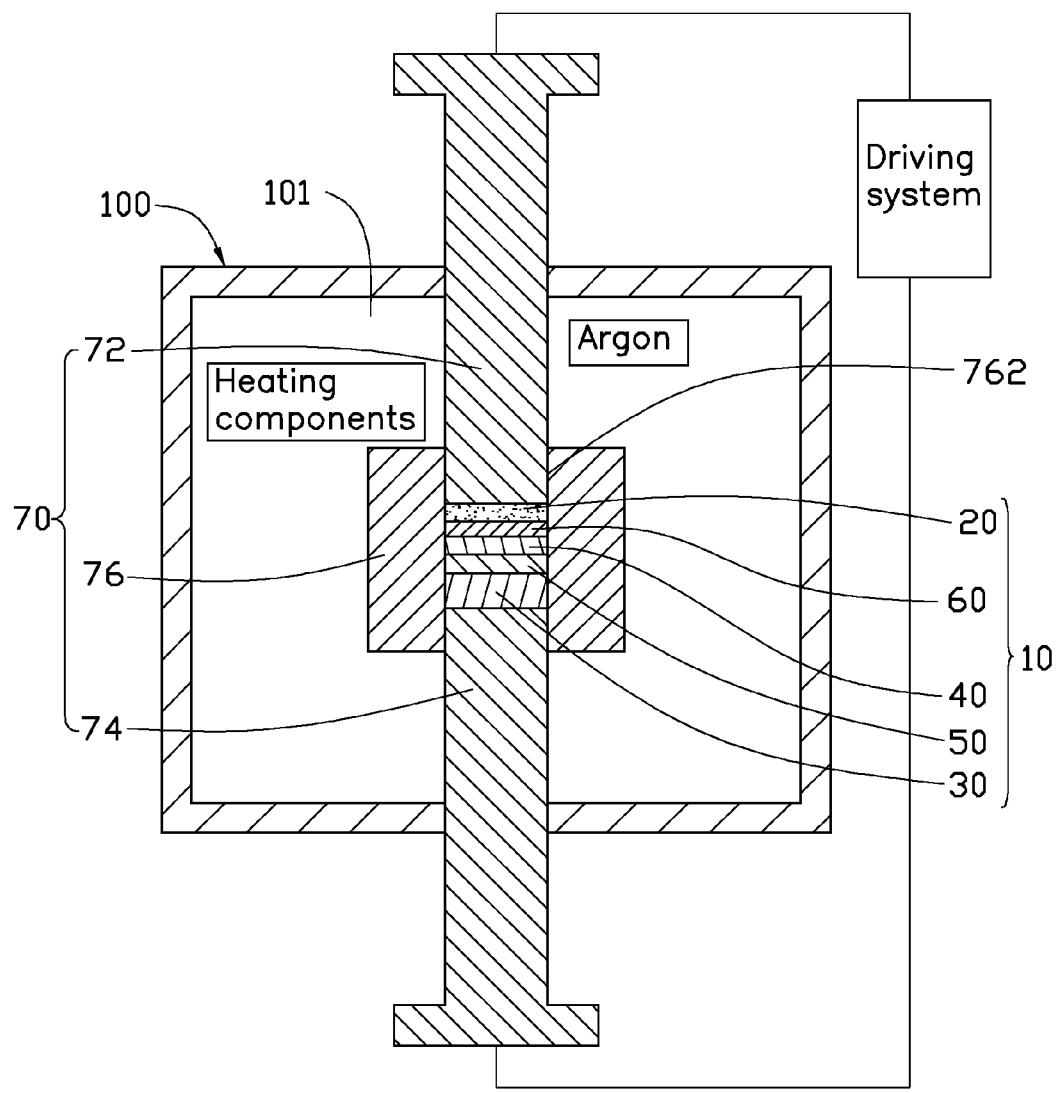
FIG. 1 is a schematic cross-sectional view of an example of a hot press sintering device for implementing the present process.

Referring to FIG. 1, an exemplary process for joining a stainless steel part and a zirconia ceramic part, may includes the following steps:

A zirconia (ZrO) ceramic part 20, a molybdenum (Mo) foil 40, an nickel (Ni) foil 50 and a stainless steel (SUS) part 30 are provided. The Mo foil 40 and the Ni foil 50 are used as a joining medium between the ZrO ceramic part 20 and the SUS part 30. The Mo foil 40 has a thickness in a range from about 0.1 millimeter (mm) to about 0.3 mm, and the Ni foil 50 has a thickness in a range from about 0.2 mm to about 0.4 mm.

The ZrO ceramic part 20, the SUS part 30, the Mo foil 40 and the Ni foil 50 are pretreated. The pretreatment may include the step of polishing the surfaces of The ZrO ceramic part 20, the SUS part 30, the Mo foil 40 and the Ni foil 50 by silicon carbide (SiC) sandpaper to produce smooth surfaces. Then, the ZrO ceramic part 20, the SUS part 30, the Mo foil 40 and the Ni foil 50 are cleaned by placing them into an organic solution to remove grease from their surfaces. The organic solution can be ethanol, and/or other organic solvents. Then, the ZrO ceramic part 20, the SUS part 30, the Mo foil 40 and the Ni foil 50 are rinsed with water and dried.

A nickel (Ni) coating 60 on the surface of the ceramic part 20 is further provided. The Ni coating 60 may be made by vacuum coating such as magnetron sputtering or chemical coating. The Ni coating 60 has a preferred thickness of about 4 μm~10 μm.

A clamping mold 70 is used to hold the ZrO ceramic part 20, the SUS part 30, the Mo foil 40 and the Ni foil 50. The clamping mold 70 includes a pressing board 72, a corresponding supporting board 74 and a receiving board 76. The receiving board 76 defines a cavity 762 running through the upper/bottom surface to receive the ZrO ceramic part 20, the SUS part 30, the Mo foil 40 and the Ni foil 50. The pressing board 72 and the corresponding supporting board 74 extend towards the cavity 762 from opposing directions and can be moved relative to the cavity 762 by a driving system such as hydraulic pressure system. The ZrO ceramic part 20, the Mo foil 40, the Ni foil 50 and the SUS part 30 are placed into the cavity 762 and clamped by the pressing board 72 and the corresponding supporting board 74. The Mo foil 40 and the Ni foil 50 are inserted between the ZrO ceramic part 20 and the SUS part 30. The Mo foil 40 abuts against the Ni coating 60 on the ZrO ceramic part 20, the Ni foil 50 abuts against the SUS part 30. The pressing board 72 and the corresponding supporting board 74 from two opposite sides, brings the surfaces of the parts to be joined into tight contact, for compressing the ZrO ceramic part 20, the Mo foil 40, the Ni foil 50 and the SUS part 30.

A hot press sintering device 100 including a chamber 101 is provided. The clamping mold 70 is placed into the chamber 101. The vacuum level inside the chamber 101 is set to about $10^{-3}$ Pa to about $9 \times 10^{-3}$ Pa. Argon (Ar) is fed into the chamber 101 to maintain the chamber 101 pressure in a range of about 0.3 MPa-0.6 MPa. The pressing board 72 and the corresponding supporting board 74 press toward each other at about 10 Mpa to firmly clamp the ZrO ceramic part 20 and the SUS part 30. Then, the chamber 101 is heated at a rate of about 10 degrees Celsius per minute (° C./min)-50° C./min. When the temperature of the chamber 101 reaches to about 300° C., the clamping pressure applied by the boards 72,74 steadily increases, until the temperature of the chamber 101 reaches to about 800° C.-1100° C., and the clamping pressure reaches to about 0.3 MPa-0.6 MPa. The pressure and heat are maintained in their respective peak ranges for about 35 min-75 min, so that the Mo foil 40 and the Ni foil 50 will chemically interact with each other, and the Mo foil 40 chemically interacts with the ZrO ceramic part 20, and the Ni foil 50 chemically interacts with the SUS part 30. Accordingly, the ZrO ceramic part 20 and the SUS part 30 are connected by the Mo foil 40 and the Ni foil 50 to form a composite article 10. The composite article 10 is removed after the chamber 101 is cooled.

Figure 2:
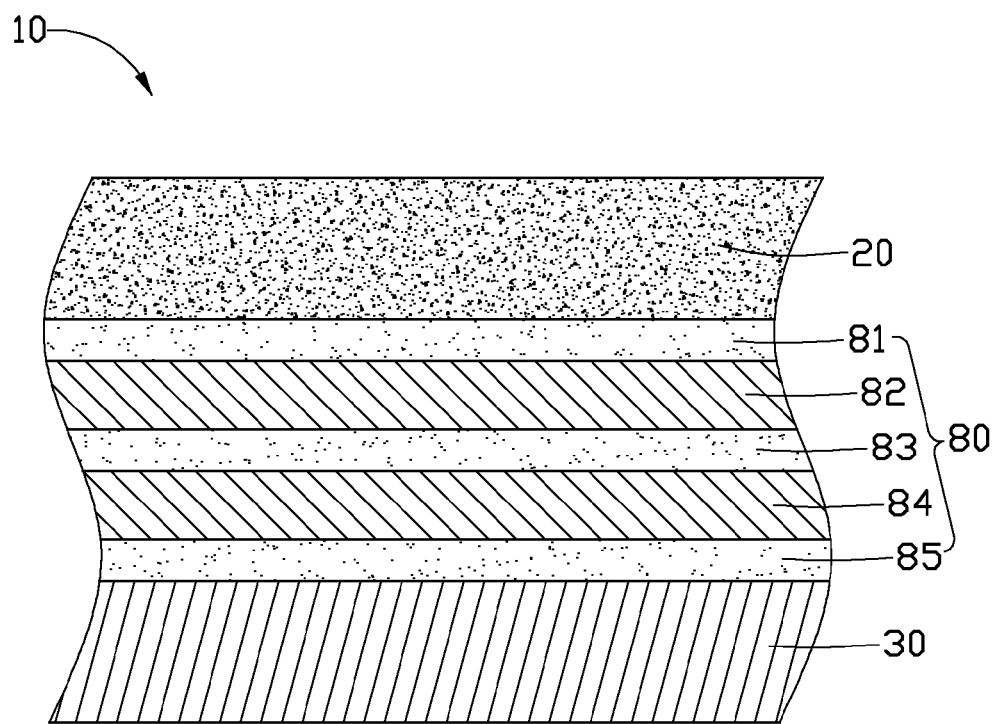
FIG. 2 is a cross-sectional view of an exemplary embodiment of the present article made by the present process.

Referring to FIG. 2, in the process of making the composite article 10, the Mo foil 40 and the Ni foil 50 act as intermediate layers to form a connecting layer 80 that connects the ZrO ceramic part 20 and the SUS part 30. The heat expansion rate of ZrO ceramic part 20 is approximately equal to that of the Mo foil 40, thus the ZrO ceramic part 20 can substantially connect with the Mo foil 40. The heat expansion rate of the SUS part 30 is approximately equal to that of the Ni foil 50, thus the SUS part 30 can substantially connect to the Ni foil 50. Furthermore, the combination of the Mo foil 40 and the Ni foil 50 to form the connecting layer 80 results in a connecting layer 80 having a rate of heat expansion that gradually changes from one end to the other. Therefore, the ZrO ceramic part 20 is securely connected with the SUS part 30 and more able to cope with temperature changes.

The composite article 10 manufactured by the present process includes the ZrO ceramic part 20 covered by the Ni coating 60, the SUS part 30 and a multi-layered connecting layer 80 connecting the ZrO ceramic part 20 to the SUS part 30. The connecting layer 80 is formed by placing the Mo foil 40 and the Ni foil 50 between the ZrO ceramic part 20 and the SUS part 30, and then heating and pressing the ZrO ceramic part 20 and the SUS part 30 as previously described. The various layers of the connecting layer 80 result from differing chemical interactions between the SUS part 30, Mo foil 40, Ni foil 50, and ZrO ceramic part 20. In particular, the connecting layer 80 includes:

a) a first transition layer 81: The first transition layer 81 mainly includes intermetallic compounds comprising Ni element and Mo element, intermetallic compounds comprising Zr element and Ni element, Ni with Mo solid solutions, and Zr with Ni solid solutions. The compounds result from chemical reactions between adjacent portions of the ZrO ceramic part 20 and Mo foil 40;

b) a Mo layer 82: The Mo layer 82 results from portions of the Mo foil 40 that do not chemically react with either the ZrO ceramic part 20 or the Ni foil 50;

c) a second transition layer 83: The second transition layer 83 is located between the Mo layer 82 and the Ni layer 84. The second transition layer 83 mainly includes intermetallic compounds comprising Mo element and Ni element, and Mo with Ni solid solutions. The compounds and solutions result from chemical reactions between adjacent portions to the Mo foil 40 and Ni foil 50;

d) an Ni layer 84: The Ni layer 84 results from portions of the Ni foil 50 that do not chemically react with either the Mo foil 40 or the SUS part 30; and e) a third transition layer 85: The third transition layer 85 is located between the Ni layer 84 and the SUS layer 30 and connects the Ni layer 84 and the SUS layer 30. The third transition layer 85 mainly includes intermetallic compounds comprising Fe element and Ni element, and Fe with Ni solid solutions. The compounds and solutions result from chemical reactions between adjacent portions to the Ni foil 50 and SUS layer 30.

The thermal expansion rate of the connecting layer 80 gradually changes from a value close to that of the ZrO ceramic part 20 (in the area of 81) to a value close to that of SUS part 30 (in the area of 85). This results in a composite article 10 well suited to temperature changes due to the gradual, rather than abrupt, changes in its internal thermal expansion rates.

Furthermore, the connecting layer 80 of the composite article 10 has no cracks or apertures, and has a smooth surface. The composite article 10 has high hardness, high temperature resistance, corrosion resistance and abrasion resistance, shear strength in a range from about 50 MPa to about 80 MPa, and tension strength in a range from about 60 MPa to about 100 MPa.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A composite article, comprising:
a zirconia ceramic part,
a stainless steel part, and
a connecting layer connecting the zirconia ceramic part to the stainless steel part, wherein the connecting layer is formed by placing a Mo foil and a Ni foil between the zirconia ceramic part and the stainless steel part with the Mo foil abutting to the zirconia ceramic part and the Ni foil abutting to the stainless steel part, then heating and pressing the zirconia ceramic part, the stainless steel part, the Mo foil and the Ni foil, the connecting layer order including a first transition layer adjacent the zirconia ceramic part, a Mo layer, a second transition layer, a Ni layer, and a third transition layer adjacent the stainless steel part, the third transition layer located between the Ni layer and the stainless steel layer mainly comprising Fe element and Ni element, and Ni—Fe solid solutions.

2. The composite article as claimed in claim 1, wherein the first transition layer located between the zirconia ceramic part and the Mo layer mainly includes compounds comprising Zr element and Mo element, and Zr—Ni solid solutions.

3. The composite article as claimed in claim 1, wherein the second transition layer located between the Mo layer and the Ni layer mainly includes compounds comprising Mo element and Ni element, and Ni—Mo solid solutions.

4. A composite article, comprising:
a zirconia ceramic part,
a stainless steel part, and
a multi-layered connecting layer connecting the zirconia ceramic part to the stainless steel part, wherein the layers of the multi-layered connecting layer comprises:
a first layer adjacent the zirconia ceramic part and comprising results of chemical reactions between zirconia and Mo;
a second layer, adjacent the first layer and comprising Mo;
a third layer, adjacent the second layer and comprising results of chemical reactions between Mo and Ni;
a fourth layer, adjacent the third layer and comprising Ni; and
a last layer adjacent to the stainless steel part and the fourth layer, and comprising results of chemical reactions between Ni and stainless steel.

* * * * *